United States Patent [19]

Jenkner

[11] 4,022,698
[45] May 10, 1977

[54] BIS-(GUANIDINE)-TETRABROMODIAN AND ITS PRODUCTION

[75] Inventor: Herbert Jenkner, Cologne, Germany

[73] Assignee: Chemische Fabrik Kalk GmbH, Germany

[22] Filed: Feb. 5, 1976

[21] Appl. No.: 655,565

[30] Foreign Application Priority Data

Feb. 26, 1975 Germany ............................ 2508188

[52] U.S. Cl. .............................. 252/8.1; 260/45.9 R; 260/564 D
[51] Int. Cl.² ................. C07C 129/00; C09D 5/18; C09K 3/28
[58] Field of Search ...................... 260/564 D, 45.9; 252/8.1

[56] References Cited

UNITED STATES PATENTS 3,740,338    6/1973    Allphin et al. ................ 260/564 D

OTHER PUBLICATIONS

Smith, "Open Chain Nitrogen Compounds", vol. 1, p. 278 (1965).
Degering, "An Outline of Organic Nitrogen Compounds", pp. 468–471, (1950).

*Primary Examiner*—Gerald A. Schwartz
*Attorney, Agent, or Firm*—Laurence & Neilan

[57] ABSTRACT

Tetrabromobisphenol A dissolved in aqueous alkalide solution is reacted with an aqueous guanidine carbonate solution to produce bis-(guanidine)-tetrabromodian having the following formula

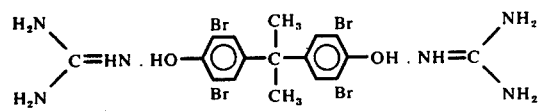

which compound has flame retardant properties.

3 Claims, No Drawings

BIS-(GUANIDINE)-TETRABROMODIAN AND ITS PRODUCTION

BACKGROUND OF THE INVENTION

The present invention relates to a novel bromine containing organic compound and to its production by reacting tetrabromobisphenol A with an aqueous guanidine carbonate solution.

Bromine containing organic compounds have found increasing use in chemical engineering, especially as starting materials for the production of pest control agents, and as flame retardant components for use in a wide variety of synthetic plastics. When used as flame retardants, it is preferred that the bromine atoms be contained in a spatially expanded molecule. In general, bromine containing compounds of larger size have the advantage that they are not as easily volatilized as is generally the case with organic bromine compounds of smaller molecular size. Consequently, the flame retardation in plastics achieved using bromine containing organic compounds which have spatially expanded molecules is more lasting, whereas such a lasting effect cannot always be achieved with more simply structured bromine containing compounds.

DETAILED DESCRIPTION OF THE INVENTION

It is a primary object of the invention to provide a new organic bromine compound with a spatially expanded molecule. Another object of the present invention is to provide a novel process for the production of said compound.

The compound of the invention has the formula

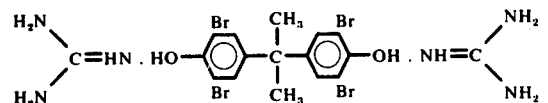

and is named bis-(guanidine)-tetrabromodian, which may also be characterized as 2,2-bis-(4-guanidine hydroxy-3,5-dibromophenyl)-propane. This compound is a colorless crystalline substance which melts at a temperature of 310° C. while decomposing.

The novel compound of the invention is preferably prepared by dissolving tetrabromobisphenol-A in an aqueous sodium hydroxide solution, adjusting the pH of the solution to 8 to 10, and adding an aqueous guanidine carbonate solution, while at a temperature of 50° to 60° C. whereupon the desired product precipitates from the mother liquor.

In order to carry out the process according to the invention, a suitable quantity water is put into a suitable reaction vessel, and the required quantity of tetrabromobisphenol A, respectively 2,2-bis-(4-hydroxy-3,5-dibromophenyl)-propane is suspended in the water and subsequently dissolved by the addition of sodium hydroxide. A starting solution develops which contains 30 to 40% by weight of tetrabromobisphenol A and 4 to 6% by weight of sodium hydroxide. After the solution has been cleared up, for example, by filtration or centrifuging, it is adjusted by careful addition of 10% hydrochloric acid to a pH value of 8 to 10, preferably 9. After that, the solution is heated to a temperature between 50° to 60° C. and the desired end product is produced and precipitated by admixture with an aqueous solution containing 25 to 30% by weight of guanidine carbonate. The quantity of guanidine carbonate solution added should be such that the guanidine carbonate quantity available for reaction corresponds to 100 to 150% of the theoretically required quantity. While stirring the reaction mixture vigorously, the reaction mixture is cooled to a temperature of 15° to 20° C. and the precipitated bis-(guanidine)-tetrabromodian is separated off. Subsequently the product is washed several times with water and is dried at a temperature of 60° to 70° C. The bis-(guanidine)-tetrabromodian obtained in this manner at a yield of 85 to 90% of the theory is sufficiently pure for most purposes of technical application. Whenever a higher degree of purity is required for special purposes, it can be additionally purified by recrystallization from water.

The bis-(guanidine)-tetrabromodian is an excellent additive for flame retardation in plastics in particular in polyolefines such as polyethylene, polypropylene, polystyrol and so on. A very good flame-retardant effect is caused with an amount of bis-(guanidine)-tetrabromodian 1 to 20 percent by weight - relative to the weight of the final product - incorporated in polyolefine. Besides the flame retardant effect the bis-(guanidine)-tetrabromodian causes further a very good antistatic effect.

The invention is further exemplified by the following illustrative, nonlimiting example.

EXAMPLE

To a reaction vessel, which is provided with a stirrer, thermometer, heating and cooling apparatus, 1000 parts by weight of water at ambient (room) temperature are added, and 816 parts by weight of tetrabromobisphenol A are suspended in the water while stirring. Subsequently and with further stirring 120 parts by weight of solid sodium hydroxide are added. After a brief time a clear solution develops which subsequently is filtered in order to separate slight residues (remnants) of insoluble substances. The slightly yellowish filtered solution is again put into the reaction vessel, heated to a temperature of 56° C., and is adjusted to a pH value of 9 by careful addition of aqueous hydrochloric acid with 10% by weight ;f HCl content. Now a solution of 270 parts by weight of guanidine carbonate in 640 parts by weight of water, which had previously been heated to a temperature of 56° C., is added drop by drop while stirring vigorously, whereupon a colorless crystalline product is precipitated. In order to complete the precipitation, the reaction mixture is cooled slowly to a temperature of 18° C. while stirring and is filtered at this temperature. After washing it three times with 150 ml of water and drying it at 70° C., there is obtained 857 parts by weight of bis-(guanidine)-tetrabromodian. This quantity corresponds to a yield of 86.6% of theory. Chemical analysis results in a bromine content of 46.0% by weight and a nitrogen content of 12.45% by weight. The corresponding theoretical values are 48.35% Br and 12.68% N.

I claim:

1. A compound of the formula

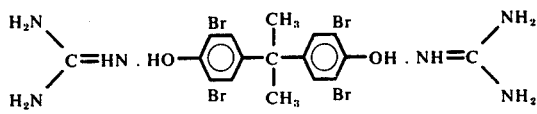

2. A composition of matter comprising a polyolefin resin and an effective amount of a flame retardant compound of the formula

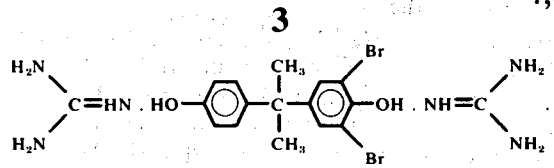
3. The composition of claim 2, wherein said flame retardant compound is present in an amount of from 1-20 percent by weight relative to the weight of the final product.
* * * * *